(12) United States Patent
Kuroda

(10) Patent No.: US 7,420,157 B2
(45) Date of Patent: Sep. 2, 2008

(54) OPTICAL ENCODER HAVING WIRING SUBSTRATE LIGHT SOURCE, AND/OR PHOTODETECTOR COVERED BY LIGHT TRANSMITTING MATERIAL AND ITS MANUFACTURING METHOD

(75) Inventor: Yoshimi Kuroda, Funabashi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/083,207

(22) Filed: Mar. 17, 2005

(65) Prior Publication Data

US 2005/0218313 A1  Oct. 6, 2005

(30) Foreign Application Priority Data

Mar. 30, 2004  (JP) ............................... 2004-100438

(51) Int. Cl.
*G01D 5/34* (2006.01)
*G06M 7/00* (2006.01)

(52) U.S. Cl. .................... 250/231.13; 250/221

(58) Field of Classification Search ................
250/231.13–231.18, 221, 559.4, 237 G, 559.3;
356/614–617; 438/24–27, 29, 31–33
See application file for complete search history.

(56) References Cited

U.S. PATENT DOCUMENTS 4,803,375 A * 2/1989 Saito et al. ............... 250/208.1
5,156,999 A * 10/1992 Lee .............................. 438/25
5,266,797 A * 11/1993 Zuefferey ................ 250/237 G
5,283,434 A * 2/1994 Ishizuka et al. ......... 250/237 G
6,081,018 A * 6/2000 Nakashiba et al. .......... 257/435
6,410,911 B1  6/2002 Omi
6,712,529 B2 * 3/2004 Horio .......................... 385/92

FOREIGN PATENT DOCUMENTS

JP  2000-321018  11/2000

* cited by examiner

*Primary Examiner*—Que T. Le
*Assistant Examiner*—Pascal M Bui-Pho
(74) *Attorney, Agent, or Firm*—Scully, Scott, Murphy & Presser, P.C.

(57) ABSTRACT

An optical encoder comprises a sensor head including a light source and a photodetector and a scale that moves relative to the sensor head. The light emitted from the light source is reflected, transmitted or diffracted by the scale, and the reflected, transmitted or diffracted light is received by the photodetector to allow the sensor head to output a displacement signal. The sensor head includes a wiring substrate having electrodes formed thereon and on which the light source and photodetector are disposed at predetermined positions and a light transmitting material that covers the wiring substrate, light source, and photodetector. A side plane obtained by cutting the wiring substrate and light transmitting material at the same time in the direction substantially perpendicular to the light receiving surface of the photodetector serves as a reference position related to disposition of the components to be mounted on the wiring substrate.

1 Claim, 10 Drawing Sheets

OPTICAL ENCODER HAVING WIRING SUBSTRATE LIGHT SOURCE, AND/OR PHOTODETECTOR COVERED BY LIGHT TRANSMITTING MATERIAL AND ITS MANUFACTURING METHOD

CROSS-REFERENCE TO RELATED APPLICATIONS

This application is based upon and claims the benefit of priority from prior Japanese Patent Application No. 2004-100438, filed Mar. 30, 2004, the entire contents of which are incorporated herein by reference.

BACKGROUND OF THE INVENTION

1. Field of the Invention

The present invention relates to an optical encoder that detects the position or the like of an object to be detected and its manufacturing method.

2. Description of the Related Art

Various types of optical encoders that detect the position of an object to be detected have been proposed.

For example, Jpn. Pat. Appln. KOKAI Publication No. 2000-321018 (U.S. Pat. No. 6,410,911 B1) discloses an optical encoder including a sensor head having the following configuration. That is, the sensor head includes an LED chip serving as a light source, a scale having a grating pattern that transmits or reflects light emitted from the LED chip, and a light-sensitive chip serving as a photodetector that receives the light transmitted through or reflected by the scale. The light-sensitive chip and LED chip are mounted on a lead frame and are then integrally molded in transparent resin, thereby obtaining a small-sized and thin-type sensor head.

In an optical encoder, the scale having a grating pattern moves relatively to the above sensor head, thereby obtaining a displacement signal from the sensor head. The displacement signal is a two-phase analog signal having phases different by 90 degrees or a digital signal obtained by converting the above analog signal in a signal processing circuit, and periodically changes with the relative movement between the scale and sensor head.

BRIEF SUMMARY OF THE INVENTION

According to a first aspect of the present invention, there is provided an optical encoder comprising:
a sensor head including:
at least one light source;
at least one photodetector having a light receiving surface;
a wiring substrate having electrodes formed thereon and on which the light source and photodetector are disposed at predetermined positions; and
a light transmitting material that covers the wiring substrate, the light source and the photodetector, wherein at least one of side planes obtained by cutting the wiring substrate and light transmitting material at the same time in the direction substantially perpendicular to the light receiving surface of the photodetector serves as a reference position related to disposition of the components to be mounted on the wiring substrate; and
a scale that moves relative to the sensor head, wherein the light emitted from the light source is reflected, transmitted or diffracted by the scale, and the reflected, transmitted or diffracted light is received by the photodetector to allow the sensor head to output a displacement signal.

According to a second aspect of the present invention, there is provided an optical encoder comprising:
a sensor head including:
at least one light source;
at least one photodetector having a light receiving surface;
a wiring substrate having electrodes formed thereon and on which the light source and photodetector are disposed at predetermined positions;
a light transmitting material disposed above the light source;
another light transmitting material disposed above the photodetector; and
an insulating material that covers at least the area including the photodetector and wiring materials electrically connected to the wiring substrate, wherein at least one of side planes obtained by cutting the wiring substrate and insulating material at the same time in the direction substantially perpendicular to the light receiving surface of the photodetector serves as a reference position related to disposition of the components to be mounted on the wiring substrate; and
a scale that moves relative to the sensor head, wherein the light emitted from the light source is reflected, transmitted or diffracted by the scale, and the reflected, transmitted or diffracted light is received by the photodetector to allow the sensor head to output a displacement signal.

According to a third aspect of the present invention, there is provided a method of manufacturing an optical encoder including a sensor head having at least one light source, at least one photodetector having a light receiving surface, and a scale that moves relative to the sensor head, in which the light emitted from the light source is reflected, transmitted or diffracted by the scale, and the reflected, transmitted or diffracted light is received by the photodetector to allow the sensor head to output a displacement signal, the method comprising:
forming a reference cutting-plane line on the substrate;
disposing the light source, photodetector, electrically functional components for driving and controlling the light source and photodetector with the reference cutting-plane line as a reference;
forming a light transmitting material in such a manner to cover the substrate, light source, photodetector, and at least a part of the reference cutting-plane line; and
cutting the substrate and light transmitting material at the same time in the direction perpendicular to the light receiving surface of the photodetector along the reference cutting-plane line, the cross-section of the light transmitting material being used as a side plane of the sensor head.

According to a fourth aspect of the present invention, there is provided a method of manufacturing an optical encoder including a sensor head having at least one light source, at least one photodetector having a light receiving surface, and a scale that moves relative to the sensor head, in which the light emitted from the light source is reflected, transmitted or diffracted by the scale, and the reflected, transmitted or diffracted light is received by the photodetector to allow the sensor head to output a displacement signal, the method comprising:
forming a reference cutting-plane line on the substrate;
disposing the light source, photodetector, electrically functional components for controlling and driving the light source and photodetector with the reference cutting-plane line as a reference;
forming a light transmitting material in such a manner to cover at least a part of the area including the substrate, light source, and photodetector;

forming an insulating material in such a manner to cover a part of the electrically functional components and at least a part of the reference cutting-plane line; and cutting the substrate and insulating material at the same time in the direction substantially perpendicular to the light receiving surface of the photodetector along the reference cutting-plane line, the cross-section of the insulating material being used as a side plane of the sensor head.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Preferred embodiments of the present invention will be described below with reference to the accompanying drawings.

First Embodiment

Figure 1:
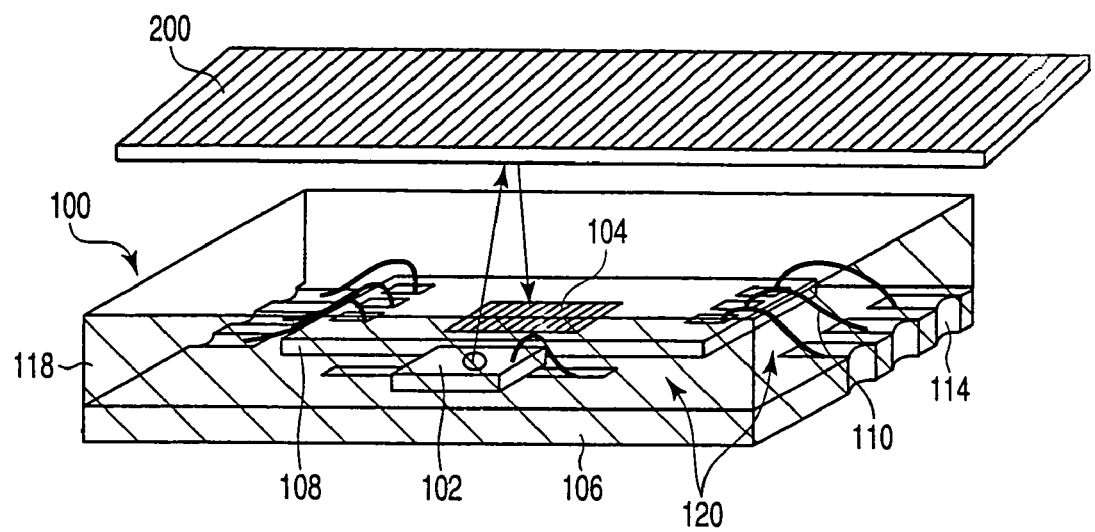
FIG. 1 is a perspective view showing the configuration of an optical encoder according to a first embodiment of the present invention.

As shown in FIG. 1, an optical encoder according to the first embodiment is a reflective optical encoder including a sensor head 100 having a light source 102 and a photodetector 104 inside thereof, and a scale 200 having a grating pattern and configured to move in a straight line relative to the sensor head 100.

Figure 2:
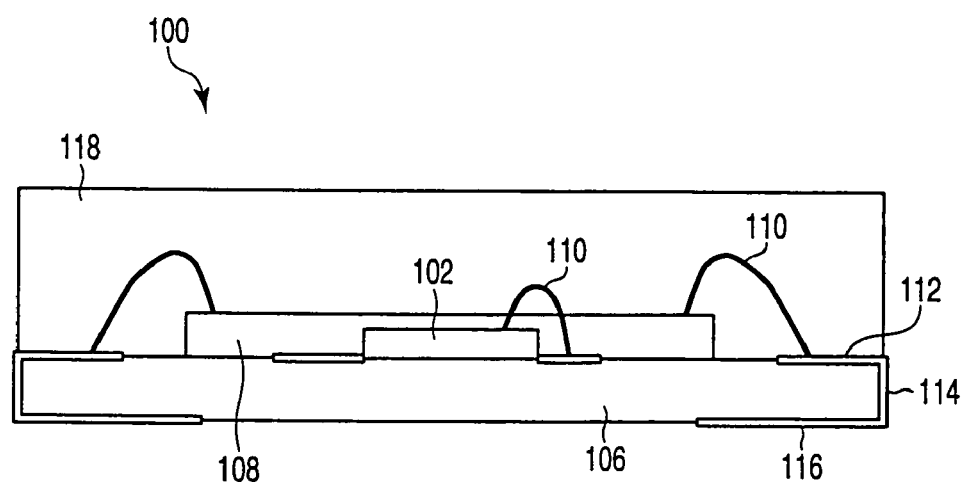
FIG. 2 is a side view showing the configuration of a sensor head of the optical encoder according to the first embodiment.

The sensor head 100 includes, as shown in FIGS. 1 and 2, a wiring substrate 106 made of ceramics, resin, or the like having electrodes, the light source 102 such as an LED or semiconductor laser, and a semiconductor IC 108 having one or more photodetectors 104 formed thereon. The light source 102 and semiconductor IC 108 are mounted on the wiring substrate 106. The light source 102 and semiconductor IC 108 are electrically connected to surface electrodes 112 of the wiring substrate 106 by conductive wires 110 or the like. Each of the surface electrodes 112 is electrically connected to a rear surface electrode 116 of the wiring substrate 106 through a lead electrode 114. The entire surface of the wiring substrate 106 including the light source 102, semiconductor IC 108, and conductive wires 110 is covered by a light transmitting material 118 such as transparent resin. The sensor head 100 has a side plane 120 substantially perpendicular to the light receiving surface of the photodetector 104 on the reference position related to disposition of the components mounted on the wiring substrate 106. Note that hatching is used to illustrate the side plane 120 for clear discrimination in FIG. 1 (and FIGS. 6, 8, 10, 12, 14, 18, and 20). That is, the hatching in this case does not show a cross-section at all.

A method of manufacturing the optical encoder having the above configuration will next be described.

Firstly, a method of manufacturing the sensor head 100 will be described.

Figure 3:
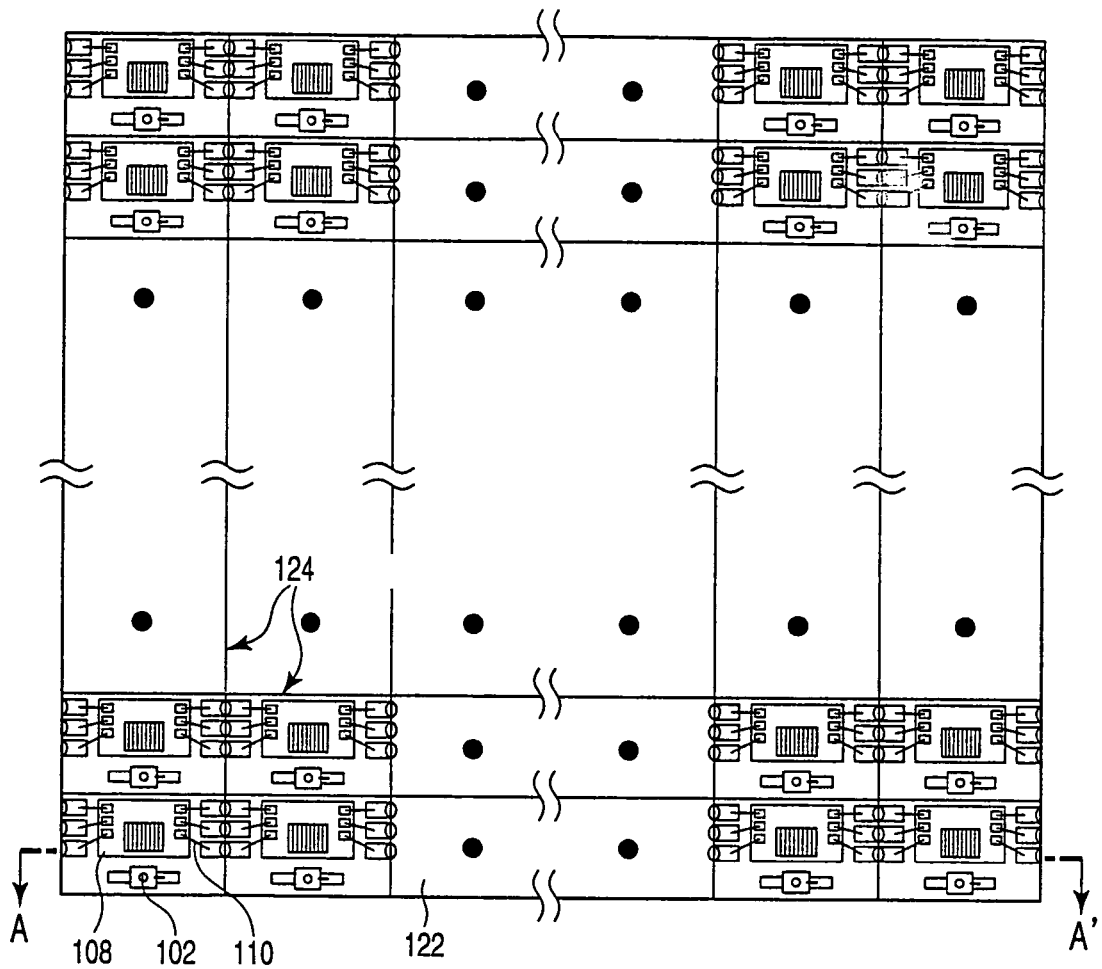
FIG. 3 is a plan view of a large-sized substrate showing disposition of components on the substrate to help explain a manufacturing method of the sensor head according to the first embodiment.

As shown in FIG. 3, a number of electrodes (surface electrodes 112, lead electrodes 114, and rear surface electrodes 116) of the wiring substrate 106 are arranged in a matrix on a large-sized substrate 122 made of ceramics or resin with a reference cutting-plane line 124 set as a reference position.

Further, the components to be mounted on the wiring substrate 106, such as a light source 102 and semiconductor IC 108 are mounted at desired positions on the large-sized substrate 122 with the reference cutting-plane line 124 serving as a reference position. For formation of the lead electrodes 114, a method in which through holes are drilled in the large-sized substrate 122 and conductive materials are placed in the through holes is available, for example. The light source 102 and semiconductor IC 108 are electrically connected to the surface electrodes 112 of the wiring substrate 106 by conductive wires 110 or the like. In the case where electrodes are formed on the reverse side of the light source 102, they are electrically connected to the surface electrodes 112 of the wiring substrate 106, by soldering or using conductive paste.

Figure 4:
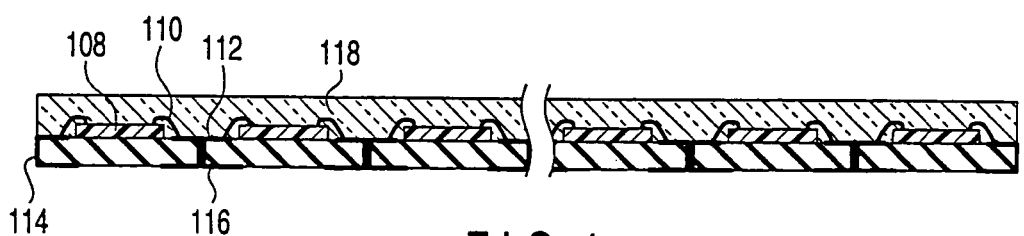
FIG. 4 is a cross-sectional view taken along A-A' line of the large-sized substrate shown in FIG. 3 in the case where a light transmitting material is formed by molding.
Figure 5:
FIG. 5 is a cross-sectional view taken along A-A' line of the large-sized substrate shown in FIG. 3 in the case where a light transmitting material is formed by potting.

Then, the light transmitting material 118 such as transparent resin is used to cover the light source 102, semiconductor IC 108, conductive wires 110, and wiring substrate 106. Various methods are available for formation of the light transmitting material 118. For example, the light transmitting material 118 can be formed by molding, as shown in FIG. 4, or by a potting process performed for each area of the sensor head 100, as shown in FIG. 5.

Finally, the large-sized substrate 122 is cut, together with the light transmitting material 118, along the reference cutting-plane line 124 in the direction substantially perpendicular to the light receiving surface of the photodetector 104 formed on the semiconductor IC 108, thereby obtaining the sensor head 100 having the side plane 120.

The side plane 120 formed by the above manufacturing method serves as the reference position for the components to be mounted on the wiring substrate 106.

An attachment between the sensor head 100 thus manufactured and scale 200 having a grating pattern will next be described.

In the case where, for example, the photodetector 104 has a rectangular shape, and where an accurate displacement signal can be obtained in the encoder by arranging the long side of the photodetector 104 parallel to the long side of the grating pattern of the scale 200, the semiconductor IC 108 is disposed such that the long side of the photodetector 104 is perpendicular to the reference cutting-plane line 124. The sensor head 100 and scale 200 are then attached to each other such that an outer plane or alignment pattern perpendicular to the long side of the grating pattern of the scale 200, which has been previously formed, and the side plane 120 obtained by cutting along the reference cutting-plane line 124 perpendicular to the long side of the photodetector 104 are aligned with each other. With the configuration thus obtained, an accurate displacement signal can be obtained. The above position adjustment is performed by visual inspection, image identification, or by contacting the target component to an auxiliary member.

Next, effects of the first embodiment will be described.

The side plane 120 of the sensor head 100 serves as a reference plane related to disposition of the components mounted on the wiring substrate 106. Therefore, merely by adjusting the positional relationship between the side plane 120 of the sensor 100 and scale 200, a satisfactory displacement signal can be obtained. This makes it easy to make the attachment between the sensor head 100 and scale 200, facilitating the attachment even in the confined space. Further, since the attachment requires a reduced number of man-hours, a low cost optical encoder can be obtained. Moreover, cutting the wiring substrate 106 and optical transmitting material 118 together prevents unnecessary protrusion of the light transmitting material 118, thereby obtaining a small-sized optical encoder.

It goes without saying that respective configurations of the first embodiment can be variously modified and changed.

For example, the number of light sources 102 and photodetectors 104 is not limited to one, but a plurality of the light sources 102 and photodetectors 104 may be mounted. The number of types of the grating patterns is not limited to one, but a plurality of types of the grating patterns may be formed on the scale 200. A circuit that converts an analog signal into a digital signal, an incorporated divider circuit, or a light source driver may be mounted on the semiconductor IC 108, in addition to the photodetector 104. As the method of electrically connecting the semiconductor IC 108 to the wiring substrate 106, there may be available a method of forming a wiring on the rear side of the semiconductor IC 108 and the wiring is connected to the wiring substrate 106 by soldering, in addition to the method using conductive wires 110. Further, not only one side plane, but also two side planes perpendicular to each other can be used as a reference position, that is, a side plane 120, related to disposition of the components mounted on the wiring substrate 106. Moreover, an optical slit may be formed on the light source 102.

Second Embodiment

Figure 6:
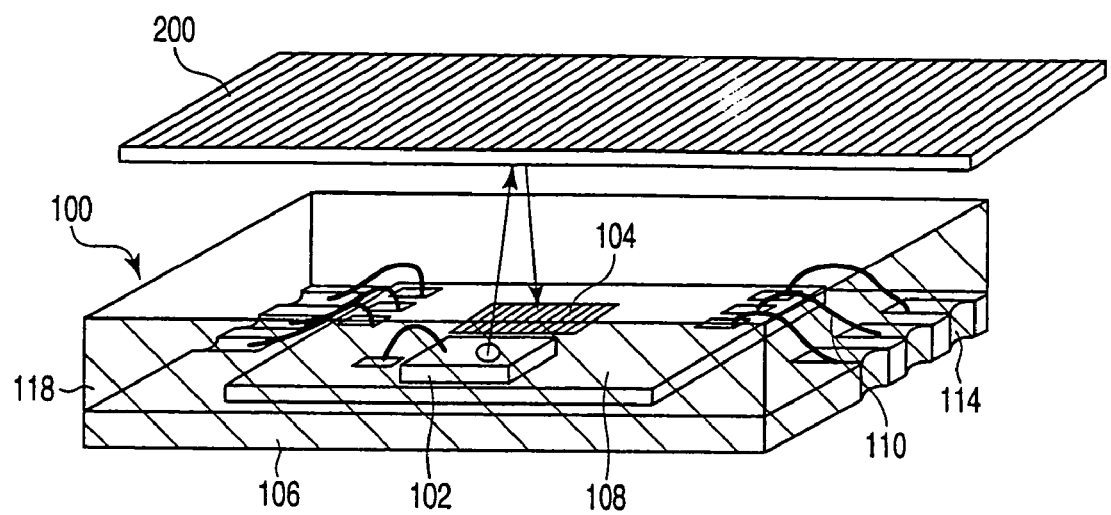
FIG. 6 is a perspective view showing the configuration of an optical encoder according to a second embodiment of the present invention.

As shown in FIG. 6, an optical encoder according to a second embodiment is a reflective optical encoder including a sensor head 100 having a light source 102 and a photodetector 104 inside thereof, and a scale 200 having a grating pattern and configured to move in a straight line relative to the sensor head 100.

Figure 7:
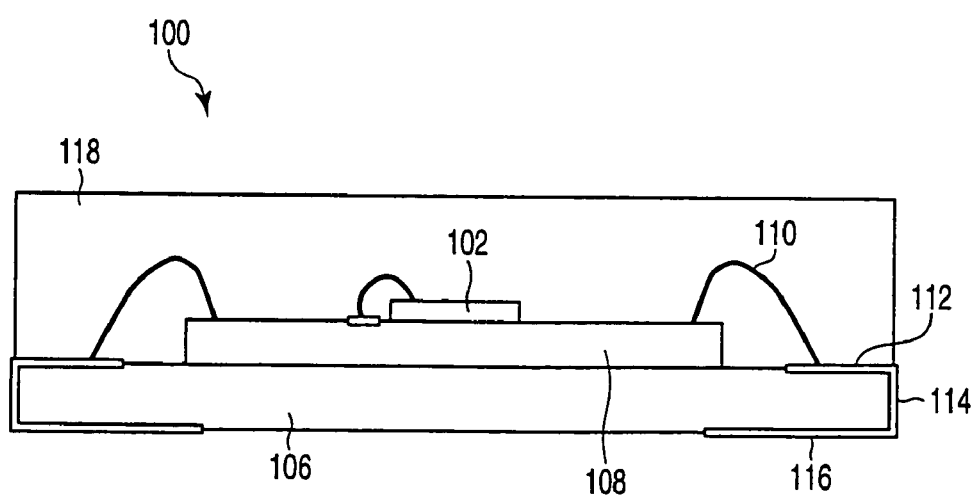
FIG. 7 is a side view showing the configuration of a sensor head of the optical encoder according to the second embodiment.

The sensor head 100 includes, as shown in FIGS. 6 and 7, a wiring substrate 106 made of ceramics, resin, or the like having electrodes and a semiconductor IC 108 having one or more photodetectors 104 formed thereon. The semiconductor IC 108 is mounted on the wiring substrate 106. The light source 102 such as an LED or semiconductor laser is also mounted on the semiconductor IC 108. Other configurations are the same as those of the first embodiment, and the descriptions thereof will be omitted.

The method of manufacturing the sensor head 100 and attachment between the sensor head 100 and scale 200 having a grating pattern are the same as those of the first embodiment, and will not, therefore, be explained further.

The second embodiment can obtain the same effect as that obtained in the first embodiment. Further, since the light source 102 is mounted on the semiconductor IC 108, the second embodiment has a particular effect that a further reduction in the size of the optical encoder can be achieved.

The same modifications and variations as those in the first embodiment can be made to the configurations of the second embodiment.

Third Embodiment

Figure 8:
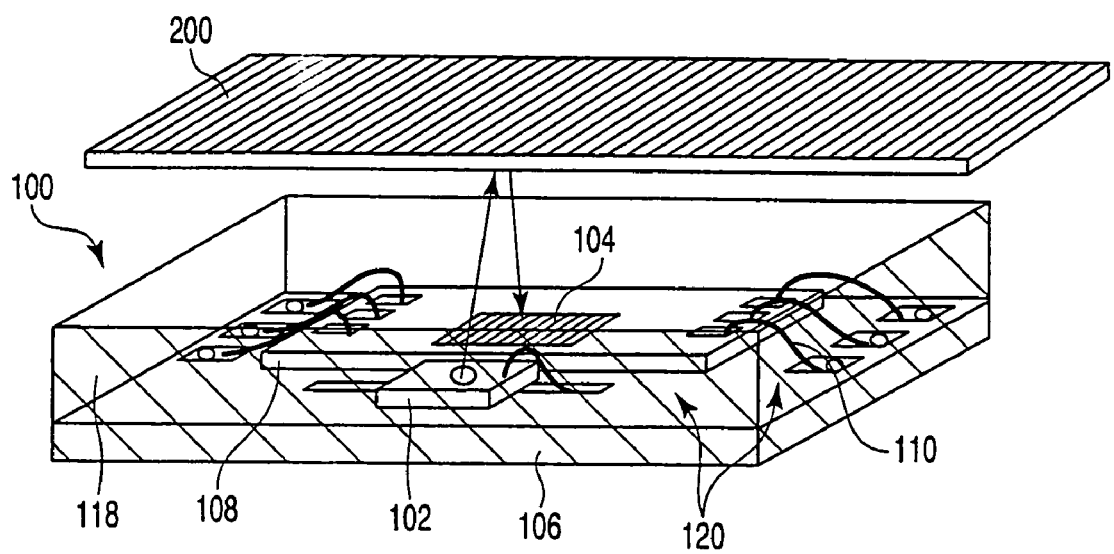
FIG. 8 is a perspective view showing the configuration of an optical encoder according to a third embodiment of the present invention.

As shown in FIG. 8, an optical encoder according to a third embodiment is a reflective optical encoder including a sensor head 100 having a light source 102 and a photodetector 104 inside thereof, and a scale 200 having a grating pattern and configured to move in a straight line relative to the sensor head 100.

Figure 9:
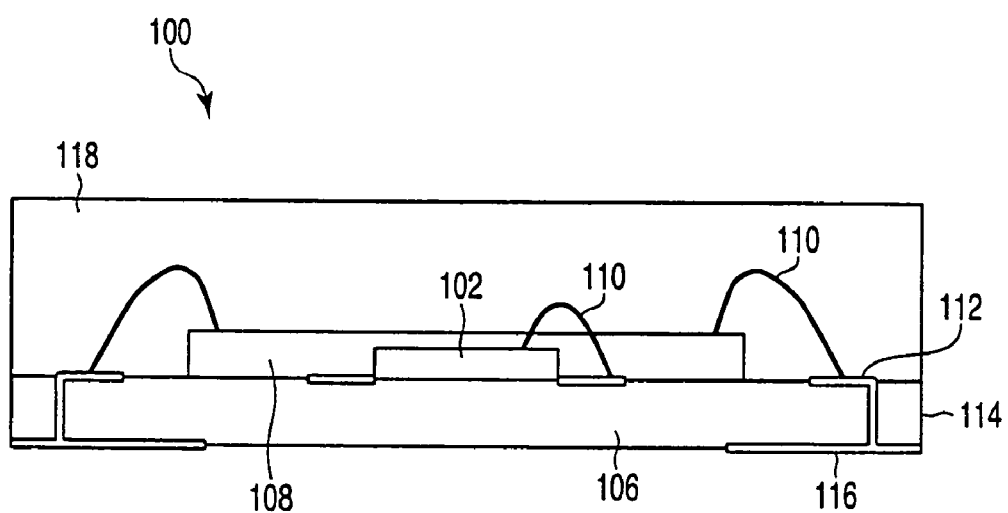
FIG. 9 is a side view showing the configuration of a sensor head of the optical encoder according to the third embodiment.

A difference between the third embodiment and the aforementioned first embodiment is that lead electrodes 114 are not exposed outside at the side surfaces of the sensor head 100, as shown in FIGS. 8 and 9. Other configurations of the sensor head 100, the manufacturing method thereof, and attachment between the sensor head 100 and scale 200 are the same as those of the first embodiment, and will not, therefore, be explained further.

The third embodiment can obtain the same effect as that obtained in the first embodiment. Further, since electrodes are exposed outside only on the rear side of the sensor head 100, the third embodiment has a particular effect that reliability of electrical connection against the external environment can be increased.

The same modifications and variations as those in the first embodiment can be made to the configurations of the third embodiment.

Fourth Embodiment

Figure 10:
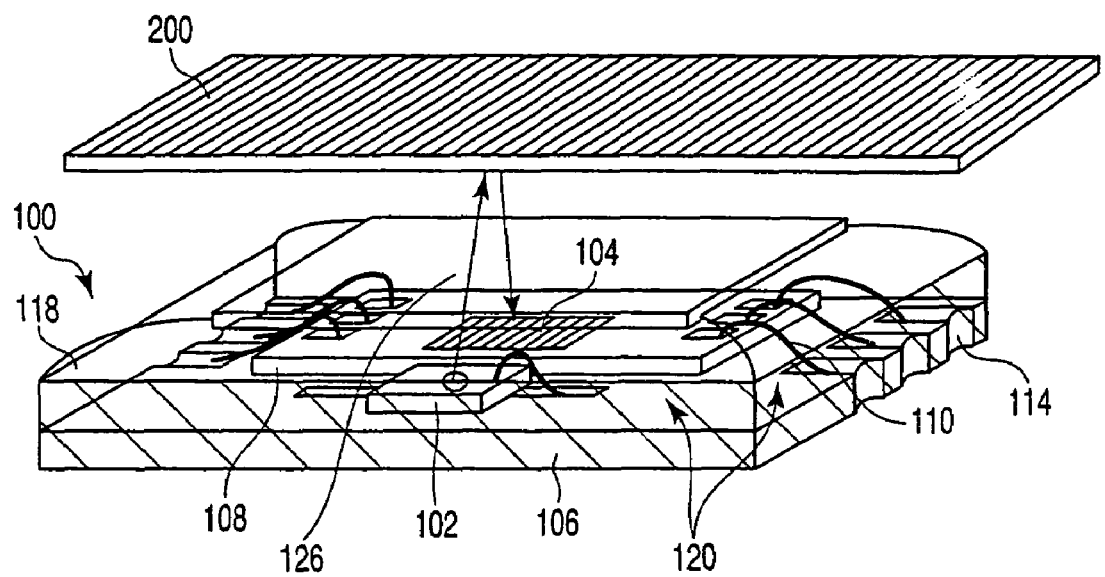
FIG. 10 is a perspective view showing the configuration of an optical encoder according to a fourth embodiment of the present invention.

As shown in FIG. 10, an optical encoder according to a fourth embodiment is a reflective optical encoder including a sensor head 100 having a light source 102 and a photodetector 104 inside thereof, and a scale 200 having a grating pattern and configured to move in a straight line relative to the sensor head 100.

Figure 11:
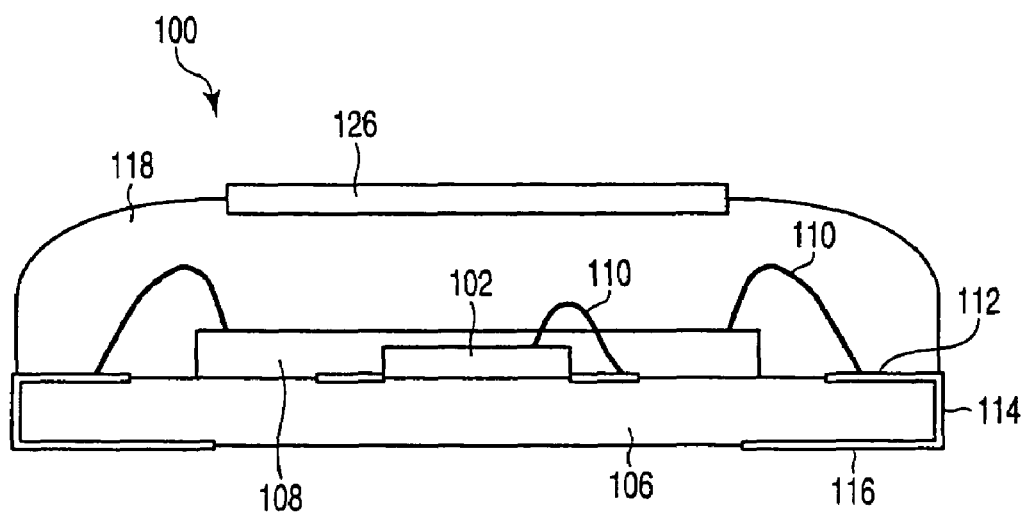
FIG. 11 is a side view showing the configuration of a sensor head of the optical encoder according to the fourth embodiment.

The sensor head 100 includes, as shown in FIGS. 10 and 11, a wiring substrate 106, a light source 102, a semiconductor IC 108, a light transmitting material 118, electrical wirings (surface electrodes 112, lead electrodes 114, rear surface electrodes 116), and a side plane 120. The above components are identical to those in the aforementioned first embodiment. In addition to the above components, the sensor head 100 according to the fourth embodiment includes a light transmitting plate 126 made of glass or the like. The light transmitting plate 126 is placed on the light transmitting material 118 in such a manner to cover the light source 102 and photodetector 104.

The manufacturing method of the sensor head 100 is the same as that used in the first embodiment except for processes related to the light transmitting plate 126. That is, after the light transmitting material 118 made of transparent resin or the like has been dropped by potting or the like, the light transmitting plate 126 made of glass or the like is so placed on the light transmitting material 118 as to cover the light source 102 and photodetector 104. Then the light transmitting material 118 is solidified while the light transmitting plate 126 is bonded to the light transmitting material 118. Finally, the large-sized substrate 122 is cut, together with the light transmitting material 118, along the reference cutting-plane line 124 in the direction substantially perpendicular to the light receiving surface of the photodetector 104 formed on the semiconductor IC 108, thereby obtaining the sensor head 100 having the side plane 120. The side plane 120 formed by the above manufacturing method serves as a reference position for the components to be mounted on the wiring substrate 106.

The light transmitting plate 126 should be disposed on the light emitting surface at which the light related to the displacement signal that has been emitted from the light source 102 is emitted from the sensor head 100 and the light incident surface at which the light related to the displacement signal that has been reflected or diffracted by the scale 200 is incident on the sensor head 100. It is preferable that the light transmitting plate 126 be disposed parallel to the surface of a grating pattern formed on the scale 200. Further, an optical slit may be formed on the light transmitting plate 126. Moreover, the light transmitting plate 126 may be in close contact with the semiconductor IC 108.

The attachment between the sensor head 100 thus manufactured and scale 200 having a grating pattern is the same as that of the first embodiment, and will not, therefore, be explained further.

The fourth embodiment can obtain the same effect as that obtained in the first embodiment. Further, since the light emitting and light incident surfaces of the sensor head 100 are realized by one plane, diffraction of the emitted light and incident light at the surface of the sensor head 100 becomes stable, so that a low noise light, that is, a light with high signal-to-noise ratio enters the photodetector 104. Therefore, a displacement signal with high accuracy can be obtained and thereby a high resolution optical encoder can be obtained.

The same modifications and variations as those in the first embodiment can be made to the configurations of the fourth embodiment.

Further, the following method may be employed to manufacture the sensor head 100. That is, after a large-sized light transmitting plate 126 is bonded to the light transmitting material 118, the large-sized substrate 122 and large-sized light transmitting plate 126 are cut together with the light transmitting material 118 along the reference cutting-plane line 124 in the direction substantially perpendicular to the light receiving surface of the photodetector 104 formed on the semiconductor IC 108.

Fifth Embodiment

Figure 12:
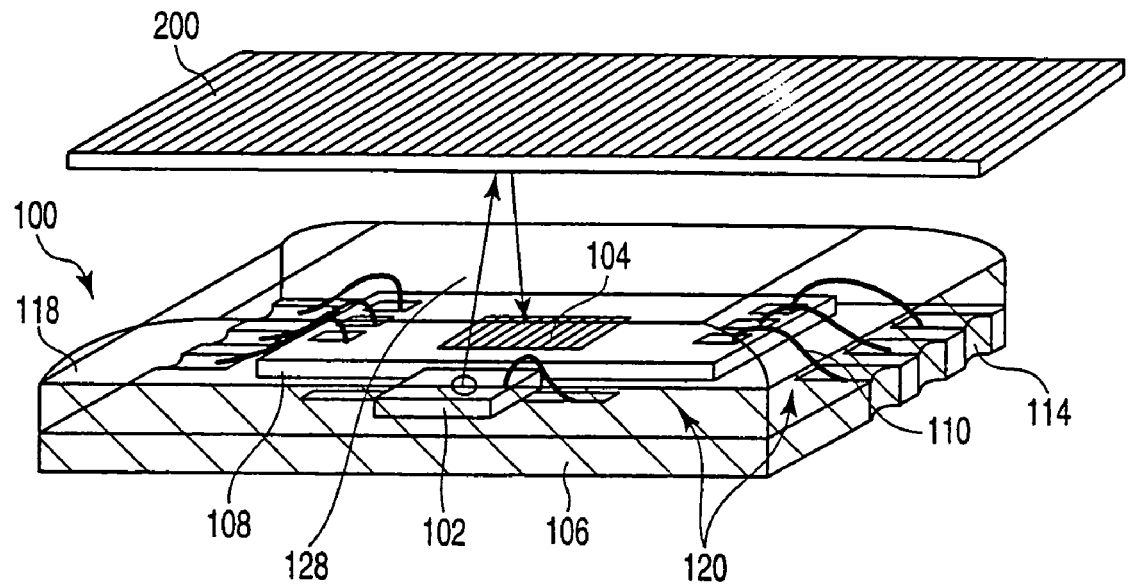
FIG. 12 is a perspective view showing the configuration of an optical encoder according to a fifth embodiment of the present invention.

As shown in FIG. 12, an optical encoder according to a fifth embodiment is a reflective optical encoder including a sensor head 100 having a light source 102 and a photodetector 104 inside thereof, and a scale 200 having a grating pattern and configured to move in a straight line relative to the sensor head 100.

Figure 13:
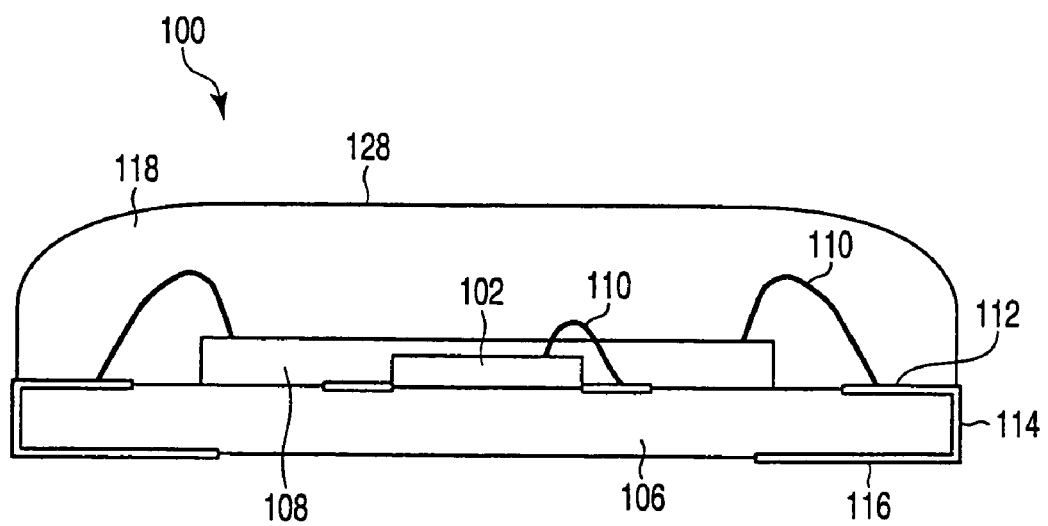
FIG. 13 is a side view showing the configuration of a sensor head of the optical encoder according to the fifth embodiment.

The sensor head 100 includes, as shown in FIGS. 12 and 13, a wiring substrate 106, a light source 102, a semiconductor IC 108, a light transmitting material 118, electrical wirings (surface electrodes 112, lead electrodes 114, rear surface electrodes 116), and a side plane 120. The above components are identical to those in the aforementioned first embodiment. Further, in the fifth embodiment, a flat surface 128 of the light transmitting material 118 serves both as the light emitting surface at which the light related to the displacement signal that has been emitted from the light source 102 is emitted therefrom and the light incident surface at which the light related to the displacement signal that has been reflected or diffracted by the scale 200 is incident thereon.

The manufacturing method of the sensor head 100 is the same as that used in the first embodiment except for processes related to the flat surface 128 of the light transmitting material 118. That is, after the surface of the sensor head 100 has been covered by the light transmitting material 118 made of transparent resin or the like, the upper surface of the light transmitting material 118 is smoothed or polished to obtain the flat surface 128 serving as the light emitting surface at which the light related to the displacement signal that has been emitted from the light source 102 is emitted therefrom and the light incident surface at which the light related to the displacement signal that has been reflected or diffracted by the scale 200 is incident thereon. Finally, the large-sized substrate 122 is cut, together with the light transmitting material 118, along the reference cutting-plane line 124 in the direction substantially perpendicular to the light receiving surface of the photodetector 104 formed on the semiconductor IC 108, thereby obtaining the sensor head 100 having the side plane 120. The side plane 120 formed by the above manufacturing method serves as the reference position for the components to be mounted on the wiring substrate 106.

The flat surface 128 of the light transmitting material 118 may completely correspond to the light emitting surface at which the light related to the displacement signal that has been emitted from the light source 102 is emitted therefrom and the light incident surface at which the light related to the displacement signal that has been reflected or diffracted by the scale 200 is incident thereon. It is preferable that the flat surface 128 of the light transmitting material 118 be parallel to the surface of a grating pattern formed on the scale 200.

The attachment between the sensor head 100 thus manufactured and scale 200 having a grating pattern is the same as that of the first embodiment, and will not, therefore, be explained further.

The fifth embodiment can obtain the same effect as that obtained in the fourth embodiment.

The same modifications and variations as those in the first embodiment can be made to the configurations of the fifth embodiment.

Sixth Embodiment

Figure 14:
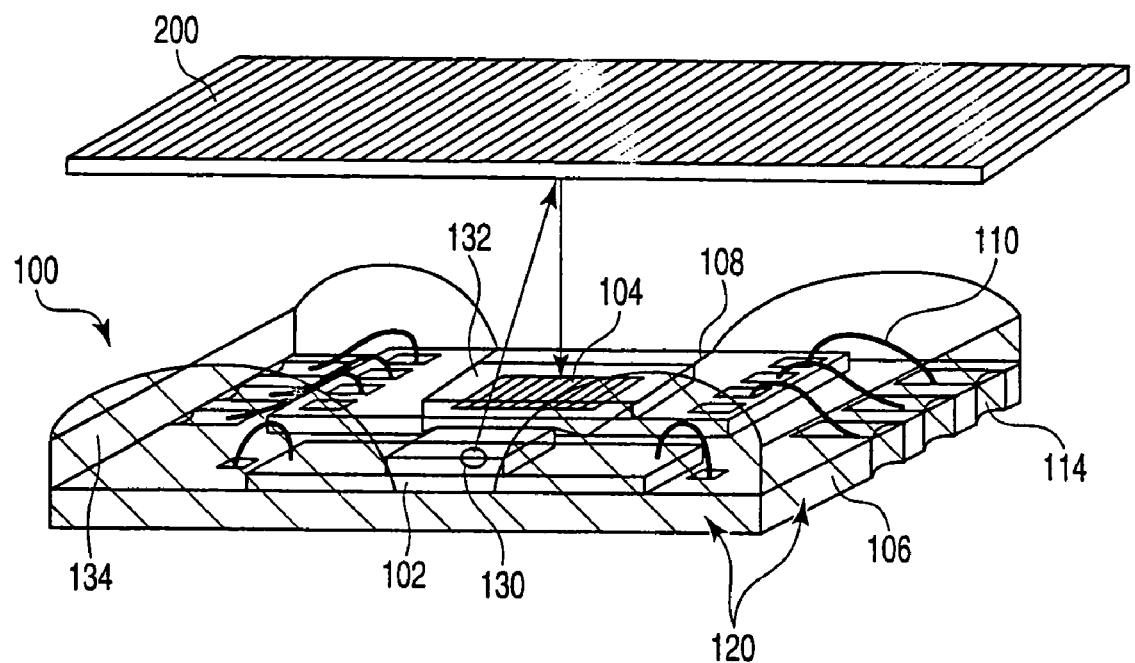
FIG. 14 is a perspective view showing the configuration of an optical encoder according to a sixth embodiment of the present invention.

As shown in FIG. 14, an optical encoder according to the sixth embodiment is a reflective optical encoder including a sensor head 100 having a light source 102 and a photodetector 104 inside thereof, and a scale 200 having a grating pattern and configured to move in a straight line relative to the sensor head 100.

Figure 15:
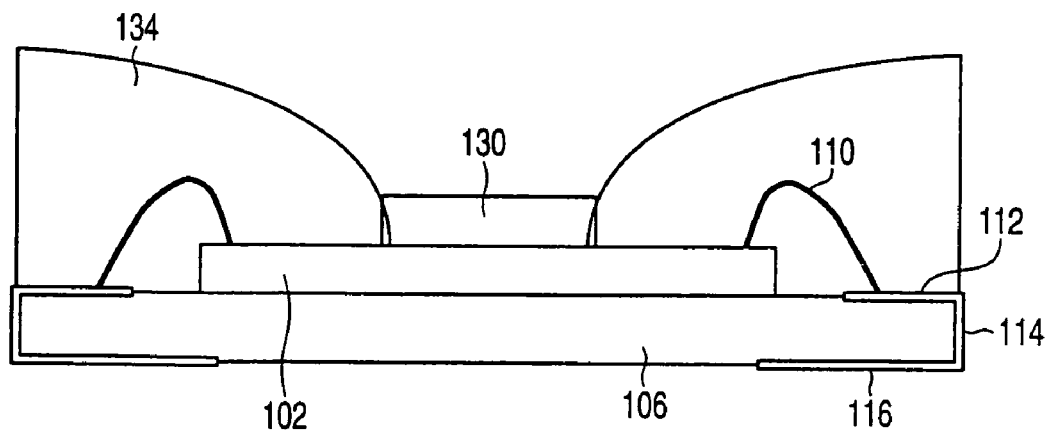
FIG. 15 is a side view showing the configuration of a sensor head of the optical encoder according to the sixth embodiment.

The sensor head 100 includes, as shown in FIGS. 14 and 15, a wiring substrate 106 made of ceramics, resin, or the like having electrodes, the light source 102 such as an LED or semiconductor laser, and a semiconductor IC 108 having photodetector 104 formed thereon. The light source 102 and semiconductor IC 108 are mounted on the wiring substrate 106. Placed on the light emitting part of the light source 102 and the light detection surface of the photodetector 104 are light transmitting materials 130 and 132, respectively. The light source 102 and semiconductor IC 108 are electrically connected to surface electrodes 112 of the wiring substrate 106 by conductive wires 110, respectively. Each of the surface electrodes 112 is electrically connected to a rear surface electrode 116 through a lead electrode 114. In the case where electrodes are formed on the reverse side of the light source 102, they are electrically connected to the surface electrodes 112 of the wiring substrate 106, by soldering or using conductive paste. The conductive wires 110 and surface electrodes 112 of the wiring substrate 106 are covered by insulating resins 134. Further, the sensor head 100 has a side plane 120 substantially perpendicular to the light receiving surface of the photodetector 104 on the reference position related to disposition of the components mounted on the wiring substrate 106.

A method of manufacturing the sensor head 100 will be described.

Figure 16:
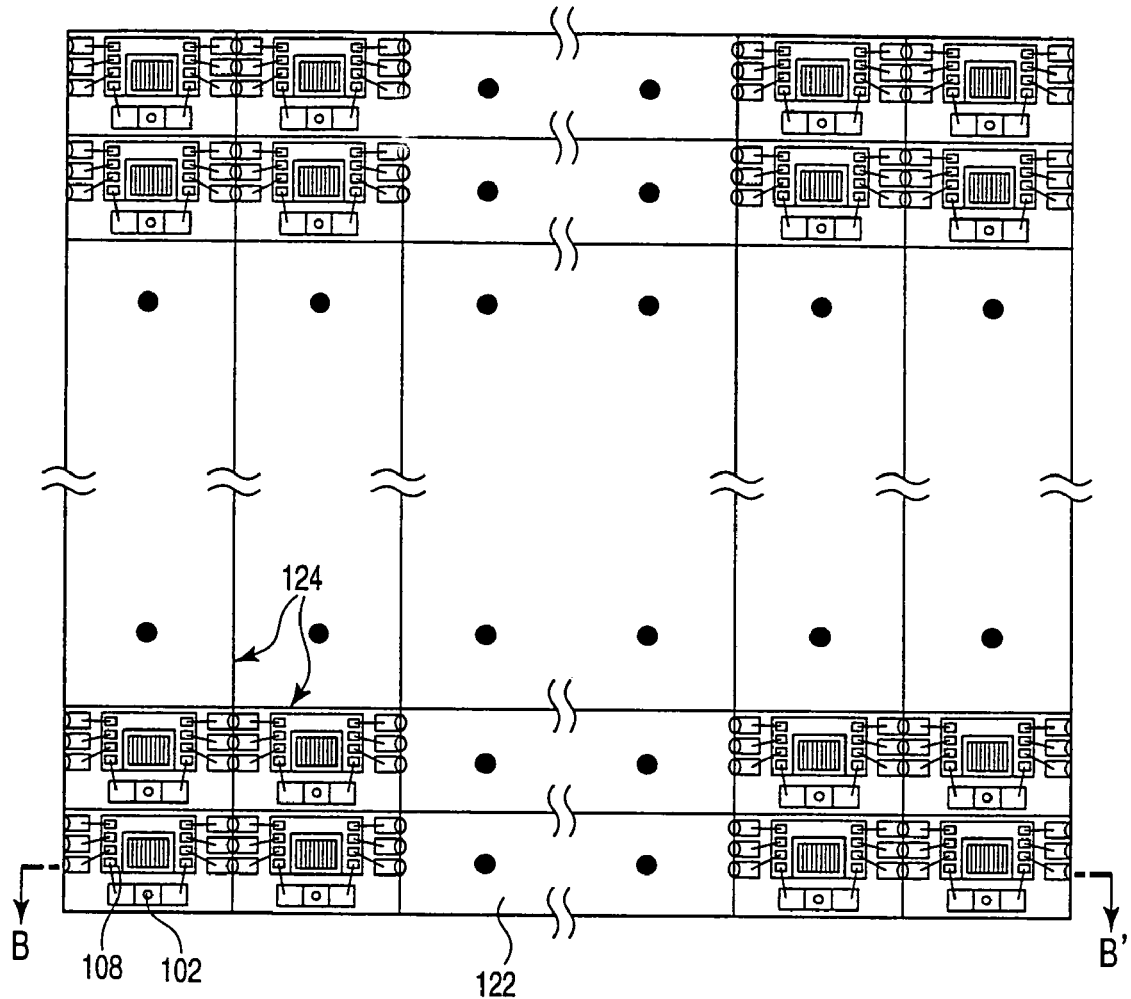
FIG. 16 is a plan view of a large-sized substrate showing disposition of components on the substrate to help explain a manufacturing method of the sensor head according to the sixth embodiment.
Figure 17:
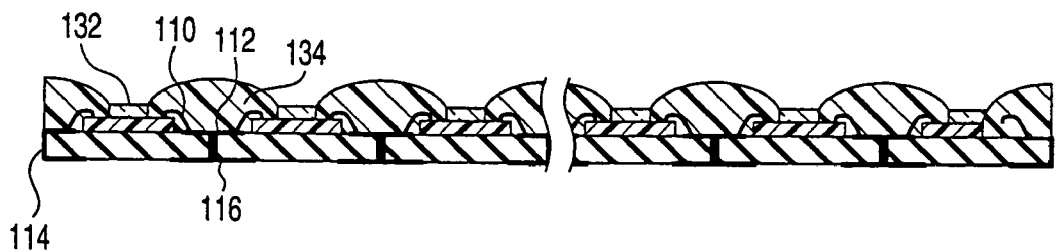
FIG. 17 is a cross-sectional view taken along B-B' line of the large-sized substrate shown in FIG. 16.

As shown in FIGS. 16 and 17, a number of electrodes (surface electrodes 112, lead electrodes 114, and rear surface electrodes 116) of the wiring substrate 106 are arranged in a matrix on a large-sized substrate 122 made of ceramics or resin with the reference cutting-plane line 124 set as a reference position. Further, the components to be mounted on the wiring substrate 106, such as a light source 102 having the light transmitting material 130 disposed on the light emitting part thereof and semiconductor IC 108 having the light transmitting material 132 disposed on the light detection surface thereof are mounted at desired positions on the large-sized substrate 122 with the reference cutting-plane line 124 serving as a reference position. The light transmitting materials 130 and 132 may be disposed on the light source 102 and semiconductor IC 108 after the light source 102 and semiconductor IC 108 have been mounted on the wiring substrate 106. Further, each of the light transmitting materials 130 and 132 may be a light transmitting plate made of glass. For formation of the lead electrodes 114, a method in which through holes are drilled in the large-sized substrate 122 and conductive materials are placed in the through holes is available, for example. After the light source 102 and semiconductor IC 108 are electrically connected to the surface electrodes 112 of the wiring substrate 106 by conductive wires 110 or the like, the conductive wires 110 and wiring substrate 106 are covered by the insulating resins 134. Finally, the large-sized substrate 122 is cut, together with the insulating resins 134, along the reference cutting-plane line 124 in the direction substantially perpendicular to the light receiving surface of the photodetector 104 formed on the semiconductor IC 108, thereby obtaining the sensor head 100 having the side plane 120. The side plane 120 formed by the above manufacturing method serves as a reference position for disposition of the components to be mounted on the wiring substrate 106.

The attachment between the sensor head 100 thus manufactured and scale 200 having a grating pattern is the same as that of the first embodiment, and will not, therefore, be explained further.

The sixth embodiment can obtain the same effect as that obtained in the first embodiment.

The same modifications and variations as those in the first embodiment can be made to the configurations of the sixth embodiment.

The insulating resins 134 may be a light shielding material.

Seventh Embodiment

Figure 18:
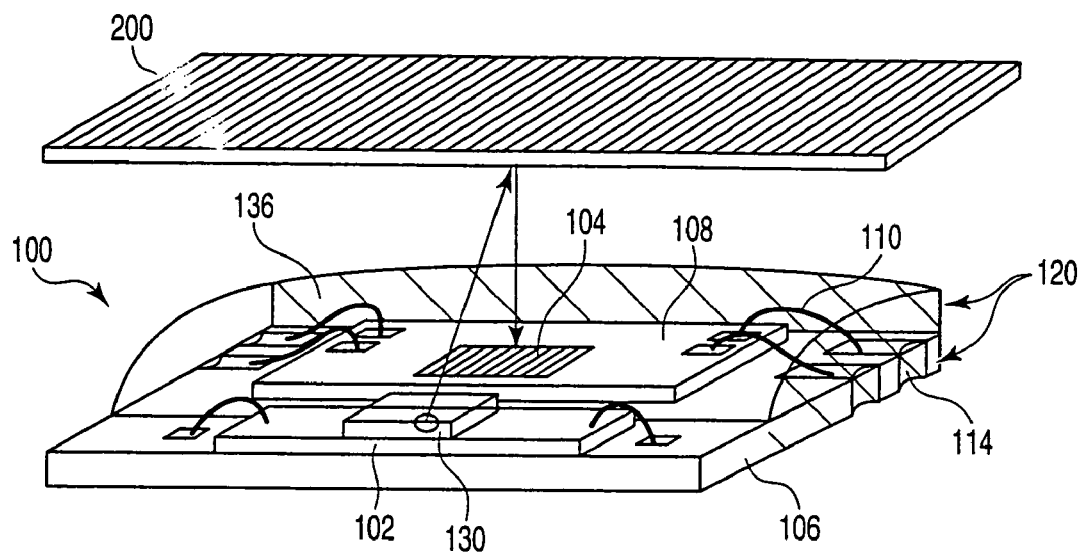
FIG. 18 is a perspective view showing the configuration of an optical encoder according to a seventh embodiment of the present invention.

As shown in FIG. 18, an optical encoder according to a seventh embodiment is a reflective optical encoder including a sensor head 100 having a light source 102 and a photodetector 104 inside thereof, and a scale 200 having a grating pattern and configured to move in a straight line relative to the sensor head 100.

Figure 19:
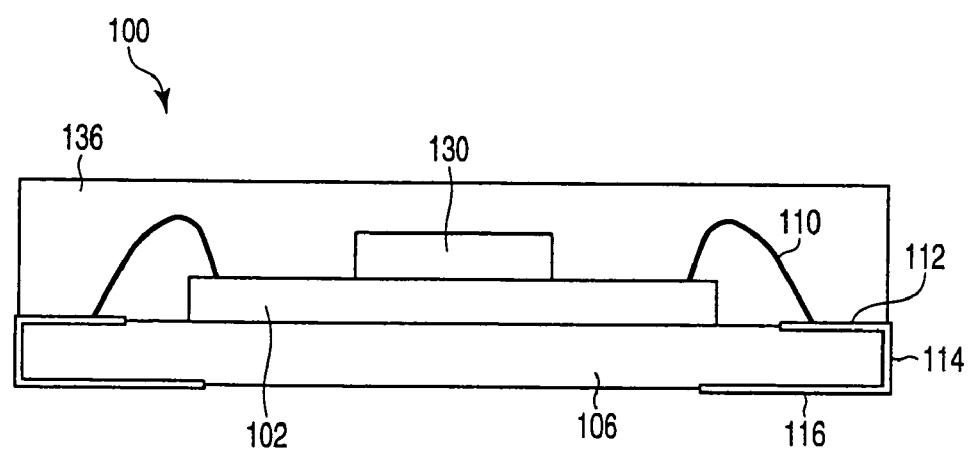
FIG. 19 is a side view showing the configuration of a sensor head of the optical encoder according to the seventh embodiment.

The sensor head 100 includes, as shown in FIGS. 18 and 19, a wiring substrate 106 made of ceramics, resin, or the like having electrodes, the light source 102 such as an LED or semiconductor laser and a semiconductor IC 108 having photodetector 104 formed thereon. The light source 102 and semiconductor IC 108 are mounted on the wiring substrate 106. Placed on the light emitting part of the light source 102 is a light transmitting material 130. The light source 102 and semiconductor IC 108 are electrically connected to surface electrodes 112 of the wiring substrate 106 by conductive wires 110, respectively. Each of the surface electrodes 112 is electrically connected to a rear surface electrode 116 through a lead electrode 114. In the case where electrodes are formed on the reverse side of the light source 102, they are electrically connected to the surface electrodes 112 of the wiring substrate 106, by soldering or using conductive paste. The area on the wiring substrate 106, including the light detection surface of the photodetector 104 and the conductive wires 110, is covered by a light-transmitting insulating material 136 such as transparent resin. Further, the sensor head 100 has a side plane 120 substantially perpendicular to the light receiving surface of the photodetector 104 on a reference position related to disposition of the components mounted on the wiring substrate 106.

Next, a method of manufacturing the sensor head 100 will be described.

Firstly, a number of electrodes (surface electrodes 112, lead electrodes 114, and rear surface electrodes 116) of the wiring substrate 106 are arranged in a matrix on a large-sized substrate 122 made of ceramics or resin with the reference cutting-plane line 124 serving as a reference position. Further, the components to be mounted on the wiring substrate 106, such as a light source 102 having the light transmitting material 130 disposed on the light emitting part thereof and semiconductor IC 108, are mounted at desired positions with the reference cutting-plane line 124 serving as a reference position. For formation of the lead electrodes 114, a method in which through holes are drilled in the large-sized substrate 122 and conductive materials are placed in the through holes is available, for example. After the light source 102 and semiconductor IC 108 are electrically connected to the surface electrodes 112 of the wiring substrate 106 by conductive wires 110 or the like, respectively, the area on the wiring substrate 106, including the light detection surface of the photodetector 104 and the conductive wires 110 is covered by a light-transmitting insulating material 136 such as transparent resin. Finally, the large-sized substrate 122 is cut, together with the light-transmitting insulating material 136, along the reference cutting-plane line 124 in the direction substantially perpendicular to the light receiving surface of the photodetector 104 formed on the semiconductor IC 108, thereby obtaining the sensor head 100 having the side plane 120. The side plane 120 formed by the above manufacturing method serves as the reference position for the components to be mounted on the wiring substrate 106.

The attachment between the sensor head 100 thus manufactured and scale 200 having a grating pattern is the same as that of the first embodiment, and will not, therefore, be explained further.

The seventh embodiment can obtain the same effect as that obtained in the first embodiment.

The same modifications and variations as those in the first embodiment can be made to the configurations of the seventh embodiment.

Eighth Embodiment

Figure 20:
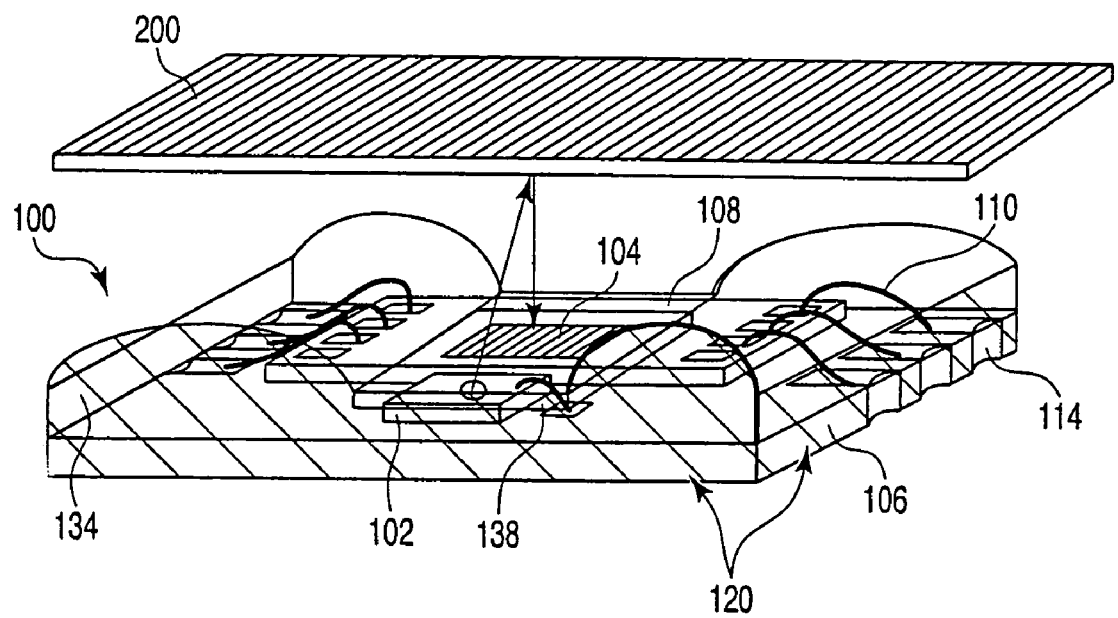
FIG. 20 is a perspective view showing the configuration of an optical encoder according to an eighth embodiment of the present invention.

As shown in FIG. 20, an optical encoder according to an eighth embodiment is a reflective optical encoder including a sensor head 100 having a light source 102 and a photodetector 104 inside thereof, and a scale 200 having a grating pattern and configured to move in a straight line relative to the sensor head 100.

Figure 21:
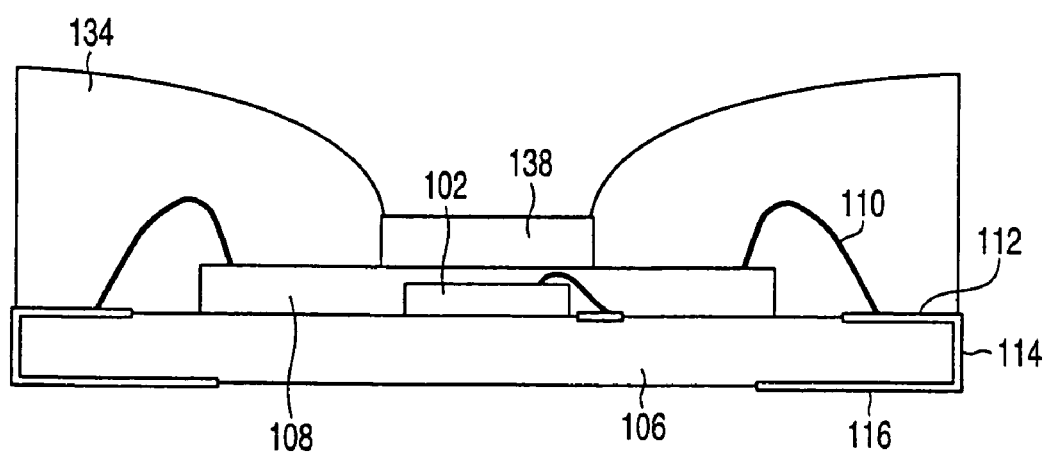
FIG. 21 is a side view showing the configuration of a sensor head of the optical encoder according to the eighth embodiment.

The sensor head 100 includes, as shown in FIGS. 20 and 21, a wiring substrate 106 made of ceramics, resin, or the like having electrodes, the light source 102 such as an LED or semiconductor laser and a semiconductor IC 108 having a photodetector 104 formed thereon. The light source 102 and semiconductor IC 108 are mounted on the wiring substrate 106. The light source 102 and photodetector 104 are directly covered by one light transmitting plate 138. The light source 102 and semiconductor IC 108 are electrically connected to surface electrodes 112 of the wiring substrate 106 by conductive wires 110, respectively. Each of the surface electrodes 112 is electrically connected to a rear surface electrode 116 through a lead electrode 114. In the case where electrodes are formed on the reverse side of the light source 102, they are electrically connected to the surface electrodes 112 of the wiring substrate 106, by soldering or using conductive paste. The conductive wires 110 and surface electrodes 112 of the wiring substrate 106 are covered by insulating resins 134. Further, the sensor head 100 has a side plane 120 substantially perpendicular to the light receiving surface of the photodetector 104 on the reference position related to the components mounted on the wiring substrate 106.

A method of manufacturing the sensor head 100 will be described.

Firstly, a number of electrodes (surface electrodes 112, lead electrodes 114, and rear surface electrodes 116) of the wiring substrate 106 are arranged in a matrix on a large-sized substrate 122 made of ceramics or resin with the reference cutting-plane line 124 serving as a reference position. Further, the components to be mounted on the wiring substrate 106, such as a light source 102 and semiconductor IC 108, are mounted at desired positions with the reference cutting-plane line 124 set as a reference position. For formation of the lead electrodes 114, a method in which through holes are drilled in the large-sized substrate 122 and conductive materials are placed in the through holes is available, for example. The light transmitting plate 138 made of glass or the like is so disposed as to cover the photodetector 104 and light source 102. A method in which an optical slit or alignment mark formed on the light transmitting plate 138 is aligned with the shape of the photodetector 104 is available. After the light source 102 and semiconductor IC 108 are electrically connected to the surface electrodes 112 of the wiring substrate 106 by conductive wires 110 or the like, respectively, the conductive wires 110 and wiring substrate 106 are covered by the insulating resins 134. Finally, the large-sized substrate 122 is cut, together with the insulating resins 134, along the reference cutting-plane line 124 in the direction substantially perpendicular to the light receiving surface of the photodetector 104 formed on the semiconductor IC 108, thereby obtaining the sensor head 100 having the side plane 120. The side plane 120 formed by the above manufacturing method serves as the reference position for the components to be mounted on the wiring substrate 106.

The attachment between the sensor head 100 thus manufactured and scale 200 having a grating pattern is the same as that of the first embodiment, and will not, therefore, be explained further.

The eighth embodiment can obtain the same effect as that obtained in the first embodiment.

The same modifications and variations as those in the first embodiment can be made to the configurations of the eighth embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing an optical encoder including a sensor head having at least one light source, at least one photodetector having a light receiving surface, and a scale that moves relative to the sensor head, in which the light emitted from the light source is reflected, transmitted or diffracted by the scale, and the reflected, transmitted or diffracted light is received by the photodetector to allow the sensor head to output a displacement signal, the method comprising:

forming a reference cutting-plane line as a reference to dispose an optical element at a desired position on a substrate;

disposing the light source and the photodetector on the basis of the reference cutting-plane line, so that a long side direction of the photo detector and the reference cutting-plane line become perpendicular;

forming a light transmitting resinous material over the substrate to resinously seal the light source, the photodetector, and at least a part of the reference cutting-plane line;

cutting the substrate and light transmitting material at the same time in the direction perpendicular to the light receiving surface of the photodetector along the reference cutting-plane line, the cross-section of the light transmitting material being used as a side plane of the sensor head; and aligning the scale and the sensor head using the side plane which is obtained by the cutting, so that a long side direction of a grating pattern of the scale and the side plane become perpendicular.

* * * * *